United States Patent [19]

Gottschalk

[11] Patent Number: 5,168,911
[45] Date of Patent: Dec. 8, 1992

[54] METHOD AND APPARATUS FOR BEAD SEALING, SEATING AND INFLATING MOUNTED TIRES

[75] Inventor: Roy F. Gottschalk, Suwanee, Ga.

[73] Assignee: Gottschalk Engineering Associates, Inc., Suwanee, Ga.

[21] Appl. No.: 640,878

[22] Filed: Jan. 14, 1991

[51] Int. Cl.$^5$ ............................................. B60C 25/06
[52] U.S. Cl. ...................................... 157/1.1; 141/95; 157/1.0
[58] Field of Search .................. 157/1, 1.1; 141/38, 141/1, 95

[56] References Cited

U.S. PATENT DOCUMENTS 3,937,264  2/1976  Mikovits et al. ..................... 157/1.1
4,126,161  11/1978  Sterling ................................. 141/95

Primary Examiner—D. S. Meislin
Attorney, Agent, or Firm—Hopkins & Thomas

[57] ABSTRACT

A method and apparatus for mounting and inflating an automobile tire on a rim assembly, the apparatus comprising a tire changing machine (11) having foot valve (32) and control means (12, 51) for limiting the air pressure developed within the tire during a step of sealing the annular beads of the tire to the flanges of the rim assembly. The control means delivers source air pressure, typically 120–200 PSI at most shops, to the fill line (34) of the tire changing machine during sealing and inflating without substantially diminishing the source air pressure delivered thereto. The control means rapidly and frequently compares the pressure attained within the tire with a selected pressure, and once the selected pressure has been attained, the control means cuts off further delivery of source air pressure. An audible alarm (72) is provided to indicate that pressurized air is flowing and to indicate that the desired pressure level has been achieved within the tire.

14 Claims, 4 Drawing Sheets

METHOD AND APPARATUS FOR BEAD SEALING, SEATING AND INFLATING MOUNTED TIRES

TECHNICAL FIELD

The present invention relates to a method and apparatus for inflating a mounted automobile tire on an automobile rim assembly to seal and seat the tire on the rim.

BACKGROUND OF THE INVENTION

To mount a tubeless automobile tire on a rim assembly, normally the inner peripheral annular- "beads" of the sidewalls of the tire are slipped over the circumference of one of the flanges of the rim assembly in a fashion similar to a button hole being slipped over a button, by changing the normally circular shape of the beads to an elongated oval shape and slipping the beads over one of the flanges of the rim assembly. With the side walls of the tire loosely positioned between the flanges and about the rim assembly, the next steps usually are: 1) to produce an air seal between the annular beads of the tire and the flanges of the wheel; 2) to "seat" the beads of the sidewalls of the tire against the flanges of the rim assembly to create a sturdy tire/wheel structure; and 3) to inflate the tire to a final inflation pressure suitable for use on the road.

As mounting of tires on rim assemblies can be laborious and time consuming, machines have been developed in the art to perform the step of slipping the tire over the rim assembly and inflating the tire. These machines include an air fill line for inflating the tire and a foot valve for delivering air to the air fill line. To seal a tire loosely positioned on a wheel with such a machine, an operator typically leans over the tire and rim assembly mounted on the machine and jostles the tire while depressing the foot pedal, causing pressurized air to flow through the tire inflator ring and through the air fill line, through the valve stem of the rim and into the tire. Usually this causes the tire to seal against the flanges of the rim. The operator then continues to depress the foot switch to use increasing air pressure within the tire to seat the beads.

It sometimes occurs that the tire beads resist seating against the flanges. This can result for example from a rusty or dirty wheel, an improperly shaped or sized rim or tire, or a failure of the operator to apply a proper lubricant to the tire prior to mounting. It is then common, though not recommended, for the operator to try to overcome this resistance by adding additional air to the tire to force the beads to seat against the flanges of the rim. Automobile tires are typically inflated to an air pressure of from 25 to 45 PSI for road use and this range is widely regarded as a safe pressure to attain during sealing and seating. The air compressors used in shops and garages to supply air to a tire changing machine typically are capable of delivering 120 PSI to 200 PSI of air pressure. In an attempt to seat the tire beads, an operator can improperly overinflate the tire to a dangerously excessive degree. This excessive air pressure can lead to a catastrophic failure of the tire bead or beads, particularly during the interval in which the tire bead yields to the increasing pressure and moves rapidly toward the seated position on the flanges. The catastrophic failure of the tire can release a large amount of energy and can result in a displacement of the tire and the rim assembly with great force and velocity. Injuries and even deaths have resulted from such a failure, by the rapidly displaced tire and wheel striking the head and upper body of the operator.

Automobile tires and rim assemblies typically have been designed with the tire bead diameter in whole inch sizes, e.g., 13 inch, 14 inch, 15 inch, etc. However, in recent years rim assemblies and tires also have been designed with tire bead diameters in half inch sizes, e.g., 15.5, 16.5 inch tire bead diameters. This has added a risk to safely mounting and inflating tires on rim assemblies because the half inch sizes make it possible to place a tire on the wrong size wheel assembly, e.g. a 16 inch tire on a 16.5 inch rim assembly. For example, some 16.5 inch rim assemblies have the same approximate maximum outside rim diameter as 16 inch rim assemblies, but have a larger bead seat diameter. FIG. 2 illustrates that the bead seat diameter, designated BSD in the figure, is smaller than the outside diameter of the flange. Thus, a 16 inch tire will slip over some 16.5 inch flanges, but it is usually impossible to bead seat a 16 inch tire on the 16.5 inch rim assembly with the use of bead seating normal air pressures of about 15 PSI. This tends to increase the adverse likelihood that the operator may over-pressurize the tire in an attempt to bead seat the tire.

Efforts have been made in the past to minimize the danger of catastrophic tire failure due to over-pressurization of the tire during bead seating of the tire against the flange of its rim assembly by limiting the pressure of the source air supplied to the air fill line in order to prevent the tire from receiving excessive air pressure. This has the distinct disadvantage of reducing the rate of air flow into the tire and therefore increasing the time it takes to fill the tire to the proper operating air pressure. This is due to the reduced pressure differential between the source air pressure in the filling hose and the air pressure within the unfilled tire. Of course, as the tire begins to fill and the pressure within the tire approaches the source air pressure, the pressure differential is made smaller yet, slowing the delivery of air to the tire even more. A reduction in source air pressure, with a corresponding reduction in flow volume through the fill line, also makes it difficult to seal the tire against the rim flanges. The operators of such equipment may improperly circumvent such air pressure limiting devices so as to use source higher air pressures and faster air flow rates to seal and more quickly fill the tires, leading to increased hazards of tire rupture as described above if the developed air pressures in the tires are not properly monitored by the operator.

SUMMARY OF THE INVENTION

Briefly described, the present invention comprises a method and apparatus for bead sealing, seating and inflating a mounted automobile tire on a rim assembly comprising a tire changing machine having a foot valve and control means for limiting the air pressure developed within the tire during the sealing and seating of the annular beads of the tire to the flanges of the rim assembly. The control means delivers source air pressure, typically 120–200 PSI at most shops, to the fill line during sealing without substantially diminishing the filling rate of the tire. In this way, the full source air pressure is delivered to the air fill line and sealing ring to provide maximum air flow and to enable rapid and reliable sealing of the tire. The control means rapidly and frequently compares the pressure developed within the tire with the first selected pressure, and once that selected pressure has been attained, cuts off the delivery of source air flow to the tire.

The control means limits the air pressure developed within the tire during seating and inflation to a second selected pressure level greater than the first selected pressure level. Preferably, the first lower air pressure is in the range of 12-15 PSIG, whereas the second selected pressure level is chosen to be on the order of 25-45 PSIG. Again, the control means delivers full source air pressure to the air fill line until the pressure within the tire reaches the second selected pressure, thereby providing rapid inflation of the tire with frequent short intervals for pressure measurement.

Preferably, the control means includes a hand-operated valve positioned remotely from the foot valve for regulating air flow for the seating and inflation of the tire. The position of the hand-operated valve is selected so that when the valve is operated by the operator, the head and torso of the operator are not bent over the tire and wheel but are remote therefrom.

Preferably, an audible alarm is provided to indicate that pressurized air is flowing during sealing, seating and filling and to indicate that the predetermined pressure level has been achieved within the tire.

To seal the tire against the rim, the operator depresses the foot valve and source air pressure is delivered to the tire to seal the beads of the tire against the rims of the rim assembly and air continues to flow into the tire until the pressure within the tire reaches the first preset pressure level, at which point the control means cuts off the delivery of source air pressure to the tire.

If the beads of the tire have not already seated against the rims of the rim assembly, this will occur when the air pressure of the tire is increased during the next step if the tire rim configuration is proper and lubricated. To seat the sealed and lightly inflated tire against the rim flanges and to inflate the tire to the second higher pressure level, the operator must now simultaneously depress and hold the remotely positioned hand-operated valve and depress the foot valve. Air flows now into the tire only while both the hand-operated valve and the foot valve are depressed. When the air pressure within the tire reaches the second selected pressure level, the control means cuts off the delivery of source air pressure to the tire, despite any further operation of the foot valve or the hand-operated valve.

With this construction, potentially dangerous over-inflation of the tire is avoided while maintaining effective and rapid sealing, seating and filling capabilities. And in the highly unlikely event that a tire should fail at the second selected pressure level (25-45 PSI), the amount of energy released thereby is significantly less, as compared with the energy released in a failure where the tire is inflated to 120-200 PSI. Furthermore, since the system requires that the operator operate both the foot valve and the remotely positioned hand-operated valve, the head and torso of the operator are likely clear of the possible travel path of the wheel in the event of a catastrophic tire bead failure.

Accordingly, it is an object of the present invention to provide a method and apparatus for bead sealing, bead seating and inflating a mounted automobile tire on a rim assembly with an improved level of safety for the operator while achieving an effective and rapid bead sealing, seating and tire filling capability.

It is another object of the invention to provide a method and apparatus for bead sealing, bead seating and inflation of an automobile mounted tire on a rim assembly which significantly reduces the likelihood of a catastrophic tire bead failure during sealing, seating or inflation.

It is yet another object of the invention to provide a method and apparatus for bead sealing, bead seating and inflation of a mounted automobile tire on a rim assembly which reduces the risk of serious bodily injury or death to the operator in the event of a catastrophic tire bead failure during seating or filling.

Other objects, features and advantages of the present invention will become apparent upon reading the following specification in light of the accompanying drawing figures.

BRIEF DESCRIPTION OF THE DRAWING FIGURES

DETAILED DESCRIPTION

Figure 1:
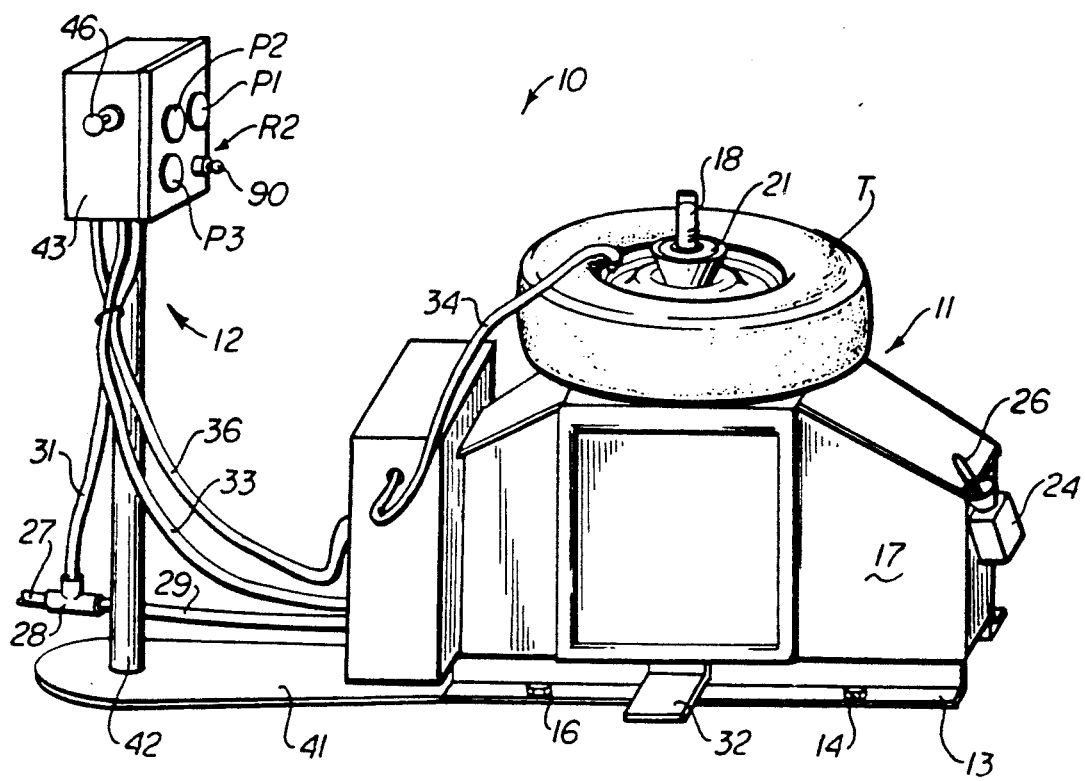
FIG. 1 is a perspective illustration of a tire mounting and inflating apparatus according to a preferred form of the present invention.

Referring now in detail to the drawing figures, in which like reference numerals represent like parts throughout the several views, FIG. 1 shows a tire mounting and inflating apparatus 10 in a preferred form of the invention. The apparatus includes a tire changing machine 11 and a control apparatus 12 for use with the tire changing machine for limiting air pressure inside the tire during sealing, seating and inflating. The invention is disclosed herein in connection with a center post type of tire changing machine as an example, and it is to be understood that other types of tire changing machines can be used with the invention. Furthermore, the tire changing machine 11 being used wherein as an example is shown in the drawings without some well known features which typify such machines, such as devices for "breaking down" the beads of the tire preparatory to removing the tire from the rim assembly and a sealing ring for assisting in sealing the tire to the rim.

The tire changing machine 11 includes a support base 13 for securely supporting the tire changing machine upon a floor as by fastening the support base to the floor with threaded fasteners 14, 16. The tire changing machine includes an unshown support framework which is covered by external cabinetry 17. A center post 18 is supported by the unshown support framework and extends vertically through an upper portion of the cabinetry 17. Center post 18 has external threads 19 for receiving a threaded cone 21. The threaded cone is typically used to secure a rim assembly W against surface 22 of the tire changing machine. A finger 23 extends vertically through surface 22 and is typically used to help secure the wheel in position on the tire changing machine by placing the conical tip of the finger 23 through one of the lug bolt holes of the rim assembly. Finger 23 is spring biased in a vertical direction and is mounted for radial movement toward and away from center post 18 to accommodate rim assemblies having different lug bolt patterns. A lubricant bottle or tire dressing bottle 24 is mounted to a side of the tire changing machine 11 for receiving a quantity of tire dressing or lubricant and an applicator brush 26.

The apparatus 10 is powered by compressed air and is adapted to be connected to a supply of source air pressure by conduit 27. The supply of source air pressure is typically provided by an air compressor capable of delivering 120 PSI to 200 PSI of air pressure. This source air pressure is delivered from conduit 27 to both the tire changing machine 11 and the control apparatus 12 by means of a T-connector 28 and conduits 29, 31. Conduit 29 delivers source air pressure to a foot valve 32 which is normally closed and when operated allows source air pressure to be delivered to the control apparatus 12 by means of a conduit 33. Control apparatus 12 selectively delivers source air pressure to an air fill line 34 through a conduit 36, as will be discussed in more detail below. Air fill line 34 terminates in a nozzle 37 adapted for connection to an inflating valve 38 mounted in the rim assembly W.

Control apparatus 12 includes a pedestal comprising a base plate 41 and an upright stanchion 42 rigidly secured thereto. Base plate 41 is rigidly secured to support base 13 and upright stanchion 42 is positioned roughly five feet from foot valve 32. Upright stanchion is roughly five feet tall and supports a cabinet or housing 43 which houses pressure gauges P1, P2, P3, adjustable pressure regulator R2, hand-operated control valve 46, and other components which together comprise a control circuit 51 shown schematically in FIG. 4.

Figure 4:
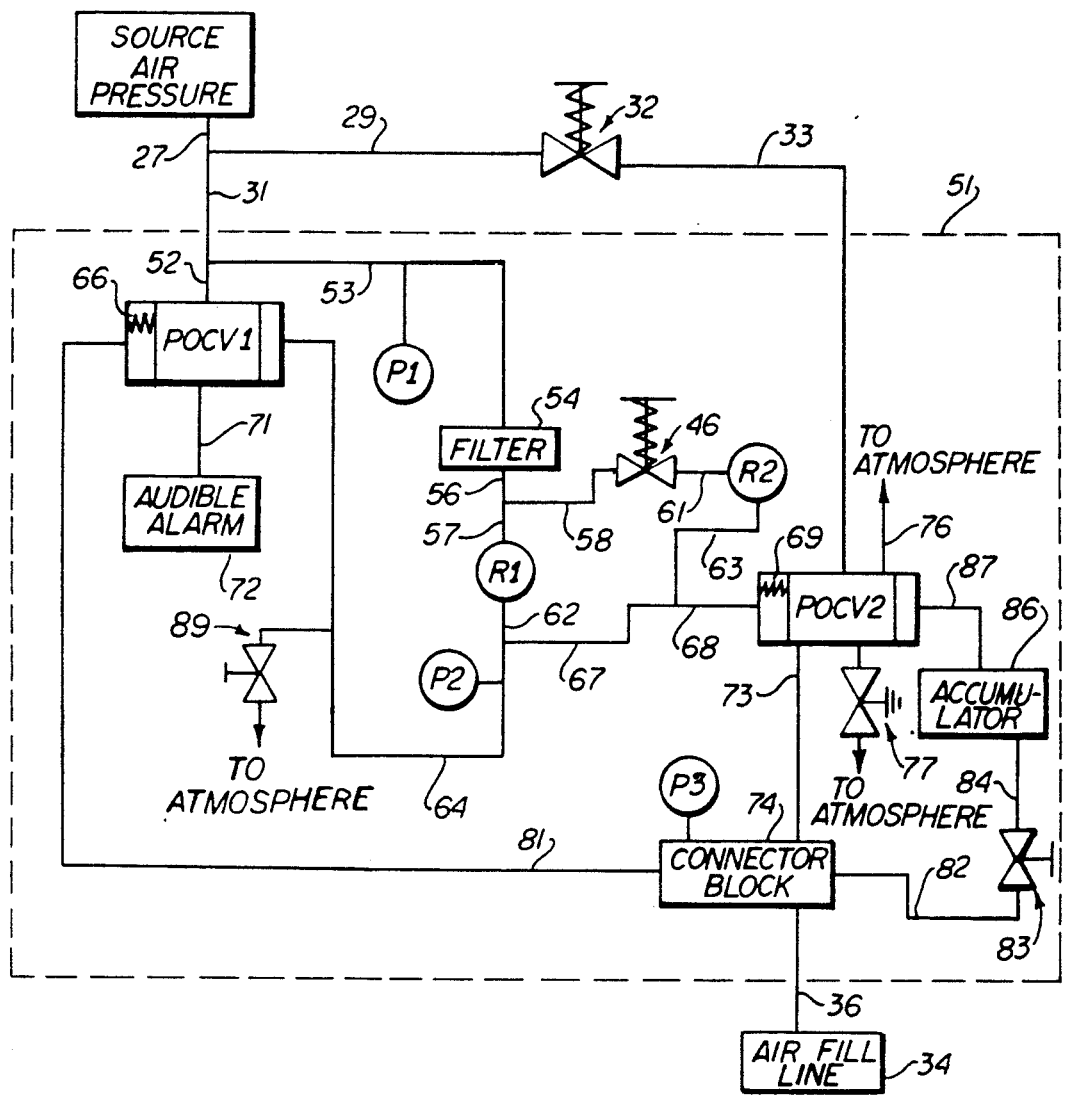
FIG. 4 is a schematic illustration of a portion of the tire mounting and inflating apparatus of FIG. 1.

As illustrated in FIG. 4, control circuit 51 receives source air pressure unimpeded through conduit 31. The source air pressure is communicated through the conduit 31 to conduits 52 and 53. Conduit 52 delivers source air pressure to a first pilot operated control valve POCVI, while conduit 53 delivers source air pressure to a filter 54. A pressure indicating gauge P1 is connected to conduit 53 to indicate the source air pressure that is being delivered to the control circuit 51 from the air compressor. The now filtered air exiting the filter 54 passes through conduit 56 and is delivered both to a pressure regulator R1 and to a hand-operated control valve 46 by means of conduits 57 and 58, respectively. Pressure regulator R1 is set to limit pressure communicated therethrough to 12-15 PSI, enough to seal the tire against the rim. Hand-operated control valve 46 is normally closed and when open allows air pressure to be communicated to a second pressure regulator R2 by means of conduit 61. Pressure regulator R2 is adjustable and is typically set to limit pressure communicated therethrough to 25-45 PSI. Adjustable pressure regulator R2 has a maximum setting of 60 PSI. These pressure regulators R1 and R2 limit the pressure developed on one side of the regulators so that there is a high pressure side and a low pressure side. For example, pressure regulator R2 has a high pressure side where the conduit 61 communicates with the regulator and a low pressure side where conduit 63 communicates with the regulator. Likewise, regulator R1 has a high pressure side in communication with conduit 57 and a low pressure side in communication with conduit 62. Conduits 62 and 63 are in fluid communication with each other. A second pressure indicating gauge P2 is in communication with conduit 62 and 63 for indicating the regulated air pressure.

The regulated pressure within conduit 62 is communicated by conduit 64 to one side of pilot operated control valve POCV1 where it augments a biasing force applied by spring 66 for urging the pilot operated control valve POCVI toward a closed position. In its normally closed position, pilot operated control valve POCVI prevents source air pressure from passing through conduit 52 and on to conduit 71, thereby preventing the operation of an audible alarm 72. This regulated pressure within conduit 62 is also communicated to the second pilot operated control valve POCV2 by way of conduits 67 and 68 to augment a force applied by a biasing spring 69 for urging the pilot operated valve POCV2 toward a normally open position.

Regulated pressure communicated through conduit 68 together with the force applied by spring 69 urges the second pilot operated control valve POCV2 toward the normally open position in which air pressure supplied to the pilot operated control valve through conduit 33 is communicated through conduit 73 to a connector block 74. In this normally open position, pilot operated control valve POCV2 prevents the flow of air through a discharge port 76 to atmosphere. A relief valve 77 is mounted to pilot operated control valve POCV2 and is adapted to open at 120 PSI.

Air pressure communicated to the connector block 74 by the conduit 73 is primarily directed to the air fill line 34 through conduit 36. Air pressure is also communicated from the connector block 74 to a control side of the first pilot operated control valve POCVI by means of conduit 81. With this arrangement, whenever air pressure is being delivered to the connector block and thereby to the air fill line, air pressure is also communicated to the first pilot operated control valve POCV1, which urges the pilot operated control valve to an open position in which source air pressure flows through conduit 52, through the pilot operated control valve POCVI, through conduit 71 and to the audible alarm 72, thereby sounding the audible alarm. The audible alarm thus indicates the flow of air through the air fill line.

Air pressure is also communicated through the connector block to conduit 82, through a flow control valve 83, through conduit 84 and to an accumulator 86. Pressure is communicated from the accumulator to the second pilot operated control valve POCV2 through a conduit 87. When the pressure delivered to one side of the pilot operated control valve POCV2 via conduit 87 is sufficient to overcome the force from the spring 69 and the pressure delivered to the other side of the pilot operated control valve by the conduit 68, the pilot operated control valve POCV2 moves toward a closed position in which air pressure delivered through conduit 33 is not communicated to the connector block 74 through the conduit 73, but is instead vented to atmosphere through discharge port 76. A pressure indicating gauge P3 is connected to the connector block 74 for indicating the pressure developed within the air fill line 34.

A bleed valve 89 is in fluid communication with conduit 64 and allows a small amount of air pressure to be discharged to atmosphere on a continuous basis, thereby keeping a small amount of air flowing through one or the other pressure regulators to keep the pressure regulators operating properly.

Figure 6B:
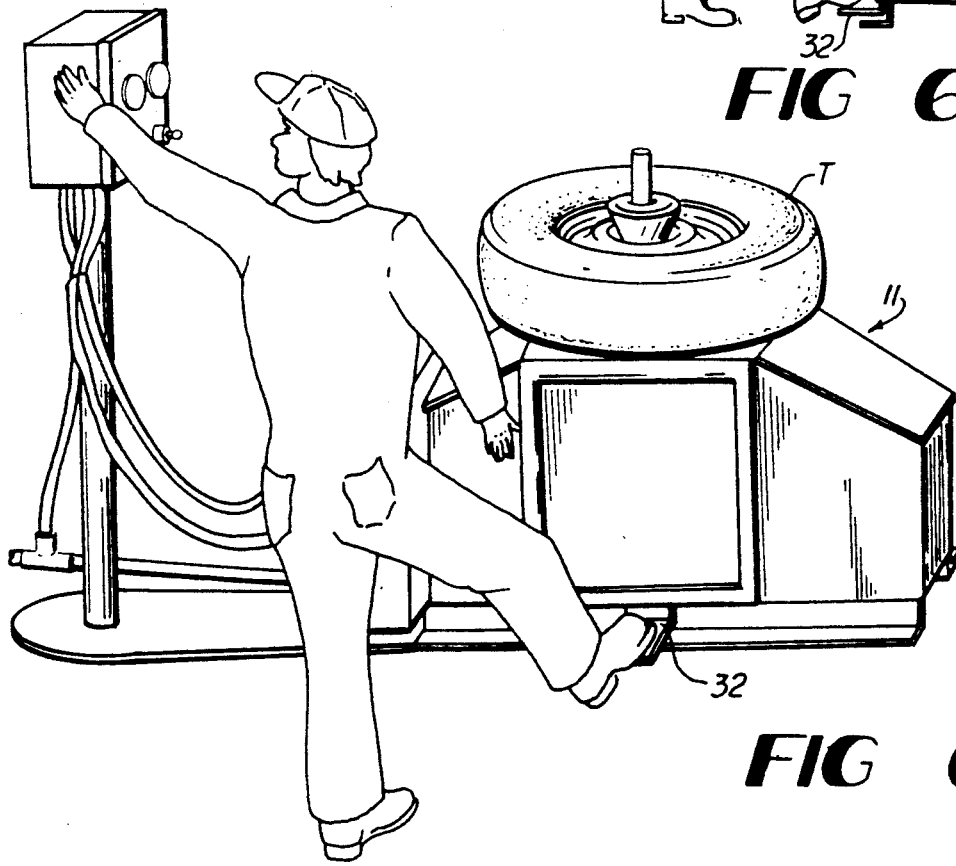
Figure 7:
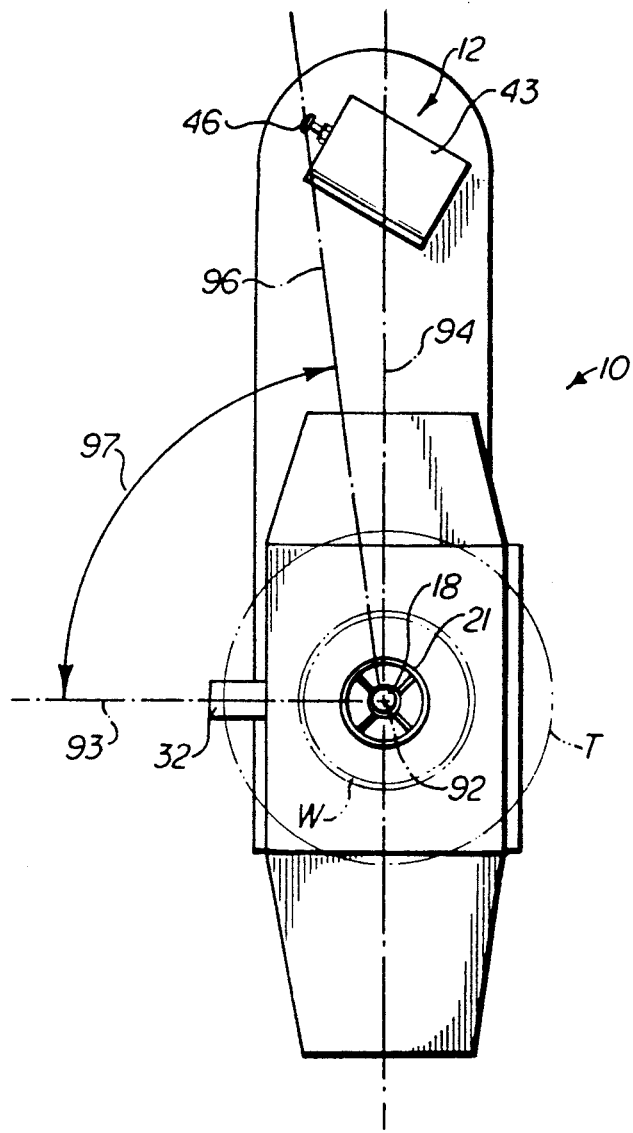
FIG. 7 is a schematic plan view of the tire mounting and inflating apparatus of FIG. 1 with some elements removed for clarity.

As shown in FIG. 7, the apparatus 10 is physically arranged so that foot valve 32 and hand valve 46 are located with respect to one another in a manner that tends to protect the operator from a likely near vertical path of travel of the wheel should the tire fail catastrophically. Center post 18 defines a vertical axis 92 about which the tire T and rim assembly W may be releasably secured against the upper surface 22 of the tire changing machine 11 by means of threaded cone 21. A vertical plane 93 extends radially from vertical axis 92 through foot valve 32. A vertical plane 94 extends radially from vertical axis 92 and is oriented at a right angle with respect to vertical plane 93. Foot valve 32 and hand valve 46 are both positioned on the same side of vertical plane 94. A vertical plane 96 extends radially from vertical axis 92 through hand valve 46 and is oriented at an angle 97 with respect to vertical plane 93. Angle 97 is sufficiently large, up to 90°, preferably less than 60°, and the distance of hand valve 46 from vertical axis 92 is sufficiently large, between four and six feet, to space the hand valve and the foot valve far enough apart from each other to require that in reaching for the hand valve while stepping on the foot valve, the head and torso of the operator must be withdrawn from over the wheel. Preferably, the angle 97 is not greater than 90° so that in reaching for the hand valve 46 while stepping on the foot valve 32, the operator is required to lean away from the wheel (see FIG. 6B).

OPERATION

Figure 2:
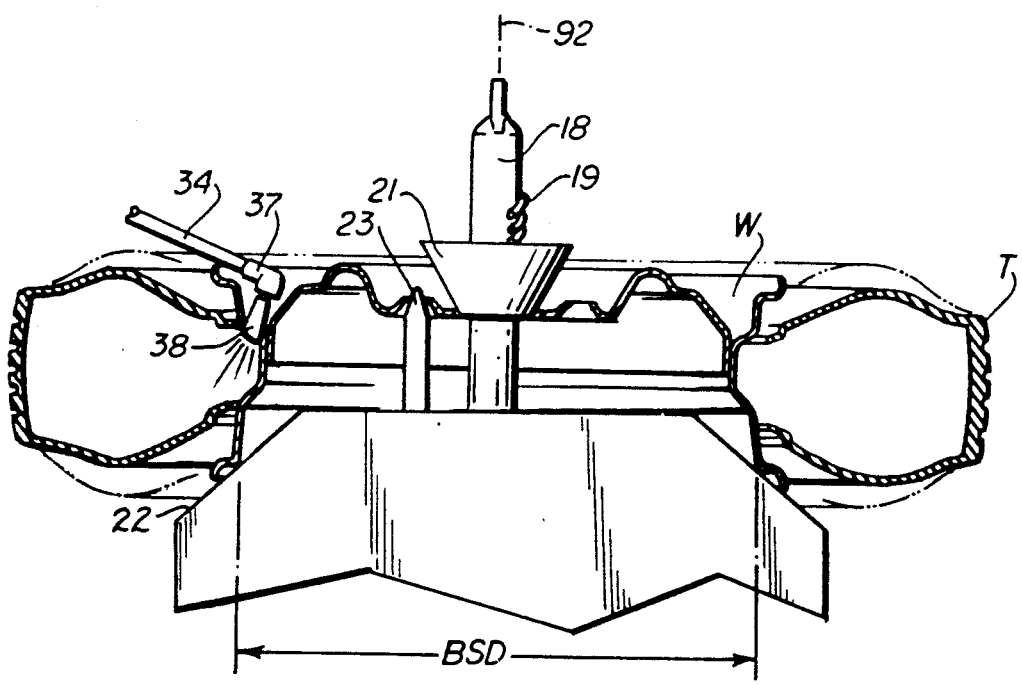
FIG. 2 is a schematic, side elevation of a portion of the tire mounting and inflating apparatus of FIG. 1.

The present invention is used to mount an automobile tire on a wheel in the following manner. The beads of the side walls of the tire are slipped over the circumference of one of the flanges of the rim assembly in the known fashion. With the side walls of the tire now loosely positioned between the rims and encircling the wheel (See FIGS. 2 and 3A), the invention can be used to seal the tire to the rim in a safe and efficient fashion.

Figure 6A:
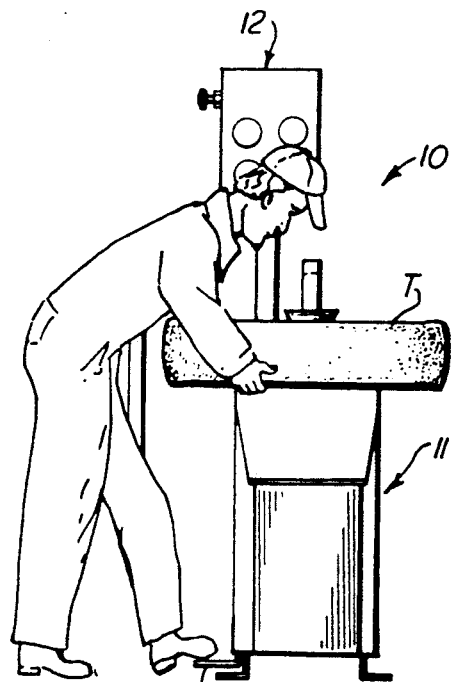
FIGS. 6A and 6B are perspective illustrations showing the tire mounting and inflating apparatus of FIG. 1 in use by an operator.

Nozzle 37 connected to the end of the air fill line 34 is first mounted to the inflation valve 38 of the rim assembly W. With the air fill line so connected to deliver air pressure to the interior of the tire, the operator of the apparatus grasps the outside of the tire with both hands and jostles the tire while simultaneously pressing foot valve 32 to cause air to flow into the tire to seal the tire. See FIG. 6A. In this sealing operation, the operator is typically leaning over the tire and wheel, and by jostling the tire with respect to the wheel, the operator can help to create a contact which would lead to an air seal between the beads of the tire and the rim flanges. See FIGS. 3A and 3B. During this sealing operation, the control apparatus 12 of the invention limits the pressure developed within the tire to a relatively low first pressure, typically set at 12–15 PSI. 12–15 PSI is all that is necessary in most circumstances to seal the tire against the properly sized and cleaned rim and if the tire has been properly lubricated prior to mounting on the wheel, 12–15 PSI is all that is necessary to seat the tire against the rim flanges. By limiting the pressure developed within the tire during this sealing and seating operation in which the operator typically has his head and torso positioned above the wheel and tire as shown in FIG. 6A, the risk or serious injury or death to the operator can be greatly reduced. Indeed, this first pressure of 12–15 PSI makes it extremely unlikely that any catastrophic failure of the tire might take place during this sealing and seating operation, and in the unlikely event that catastrophic failure of the tire did occur, the amount of energy released thereby would be so small that the risk of serious injury or death to the operator is significantly reduced.

The control circuit 51 limits the pressure attained in the tire during the sealing and seating operation in the following manner. With the air fill line 34 attached to the inflation valve of the rim assembly, the operator depresses the foot valve 32 to cause air to flow from the supply of source air pressure through conduit 33 to pilot operated valve POCV2. Air pressure is also delivered from the supply of source air pressure through filter 54 through regulator R1 to one side (the left side in the figure) of the pilot operated control valve POCV2 to urge the pilot operated control valve toward an open position in which the valve allows air to flow through the valve and then through conduit 73 to connector block 74 and then subsequently to conduit 36 and to the air fill line 34. Air pressure is also directed from the connector block through conduit 82 through flow control valve 83 and to accumulator 86 and then to another side (the right side in the figure) of the pilot operated control valve POCV2 in a configuration similar to a feedback loop. The flow control valve 83 and the accumulator 86 together act to delay the pressure signal that is delivered from the connector block 74 to the conduit 87 leading to the right side of the pilot operated control valve POCV2.

With this construction, as air begins to flow from conduit 33 through the pilot operated control valve POCV2 and to the connector block and to the air fill line, pressure begins to build within the accumulator, which pressure is then communicated to the right side of the pilot operated control valve where it tends to urge the control valve toward a closed position. When the pressure on this right side of the pilot operated control valve POCV2 is sufficient to overcome the force of the spring 69 and the pressure delivered by conduit 68 to the left side of the pilot operated control valve, the pilot operated control valve moves to a closed position in which no more air pressure is delivered through conduit 73, but the air pressure delivered through conduit 33 is instead shunted to atmosphere through discharge port 76. At this point, the air pressure within the tire, the air fill line, the connector block, the accumulator and other components in fluid communication with each other tends to quickly come to an equilibrium pressure. If that equilibrium pressure is less than the desired sealing pressure of 12–15 PSI, then the force acting on the pilot operated control valve POCV2 from the right side is less than the force acting on the pilot operated control valve POCV2 from the left side and the valve moves toward the open position in which air can once again flow through conduit 73. On the other hand, if the pressure attained within the tire and the other components is equal to or greater than the desired pressure, the pilot operated control valve POCV2 remains closed. In this closed position, pressure relief valve 77 is in communication with conduit 87, thereby preventing the tire from retaining more than the opening pressure (120 PSI) of the relief valve 77.

In operation, as air is delivered to the pilot operated control valve POCV2 by the conduit 33, a rapid cycling of the pilot operated control valve POCV2 takes place, with the pilot operated control valve, in effect, rapidly comparing the pressure attained within the tire with the desired pressure. During this filling of the tire, the pilot operated control valve POCV2 rapidly alternates between open and closed positions until the desired pressure has been attained within the tire, at which point the valve remains closed. During the sealing of the tire by inflating up to a relatively low pressure of 12-15 PSI, the audible alarm 72 is sounded to indicate that air is being delivered to the tire, and upon attainment of the selected pressure, continues to sound to indicate that the desired pressure has been reached.

The audible alarm 72 is powered by the output of pilot operated control valve POCV1 which is supplied with source air pressure through conduit 31. Pilot operated control valve POCV1 is urged toward a right position by a spring 66 and by pressure delivered through conduit 81. Air pressure communicated to the connector block 74 is communicated through conduit 64 to the left side of the pilot operated control valve POCV1 to tend to counteract the forces urging the pilot operated control valve toward the right position. During the sealing operation, the source air pressure, which is supplied to the connector block through pilot operated control valve POCV2, is communicated to the left side of the pilot operated control valve POCV1 by conduit 81. This source air pressure is significantly higher than the regulated air pressure communicated to the right side of the pilot operated control valve through conduit 64, thereby causing the pilot operated control valve POCV1 to move toward the right position in which the audible alarm is powered by source air pressure delivered through the pilot operated control valve through conduit 71. Upon the attainment of the first selected pressure within the tire, the source air pressure is delivered to conduit 81. At this point, the pressure developed within the tire is delivered through conduit 81 and is sufficient to maintain the pilot operated control valve POCV1 in the right position, thereby enabling the audible alarm to indicate that the first selected pressure has been attained within the tire with the operator foot removed from valve 32. To stop the audible alarm from sounding, one can decrease the pressure within the tire slightly by disconnecting the air fill line 34 from the valve in the rim assembly, or in the alternative, one can briefly operate an unshown manual operated valve which is typically found in communication with the air fill line of many known tire changing machines.

Figures 3A, 3B, 3C:
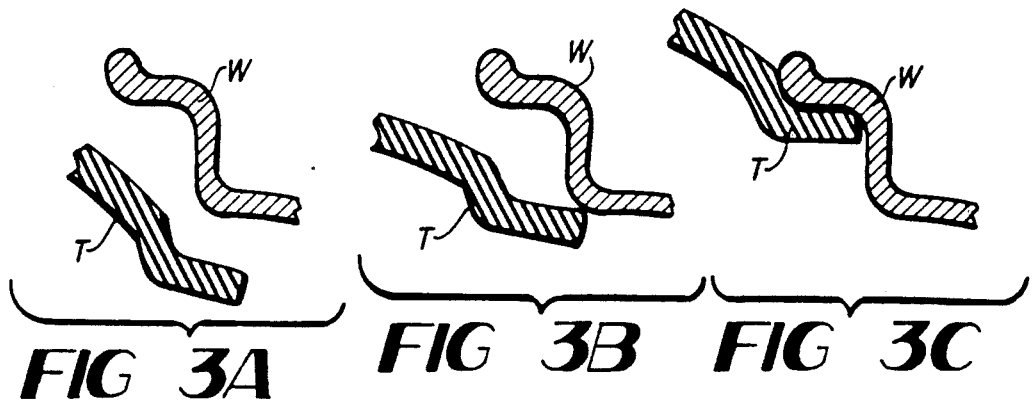
FIGS. 3A-3C are sectional views of a portion of a tire and rim assembly, showing the tire loosely mounted, sealed, and seated, respectively.
Figure 5:
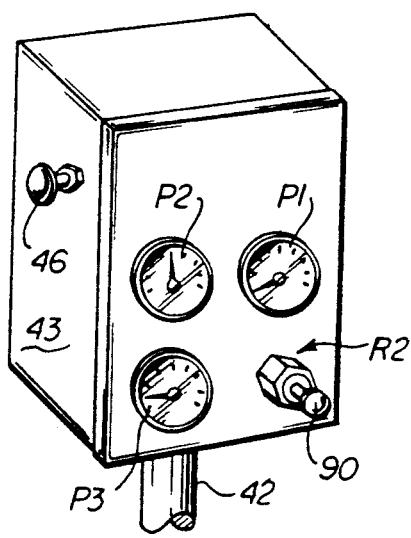
FIG. 5 is an enlarged perspective view of the tire inflating apparatus of FIG. 1.

If the tire and rim assembly are properly constructed, and if the operator has properly cleaned and lubricated the tire and rim assembly prior to mounting the tire on the wheel preparatory to sealing the tire to the wheel, this relatively low sealing pressure of 12-15 PSI is normally sufficient to move the tire to a fully seated position as shown in FIG. 3C. In the event, however, that the tire does not become seated at this relatively low pressure, the control apparatus 12 further protects the operator from injury by requiring that the operator reach for a hand operated valve 46 which is positioned well to one side of the tire changing machine, so that in the unlikely event that the tire should catastrophically fail, the head and torso of the operator are likely to be clear of a near vertical path of travel of the exploding tire. Once the first selected pressure or sealing pressure of 12-15 PSI has been attained within the tire during the sealing operation, any further operation of foot valve 32 in and of itself does not deliver any additional air pressure to the tire. Rather, at this juncture, in order for the operator to continue to add air to inflate the tire or to seat the tire against the rim, the operator must both depress the foot valve 32 and operate the hand valve 46, as shown in FIG. 6B. By requiring that both the hand valve and the foot valve be operated simultaneously, the operator retains control in the event that one of the valves is accidentally or unexpectedly operated.

During this inflating and seating operation, the pilot operated control valves perform in substantially the same manner as previously described in connection with the sealing operation. The significant difference between the sealing operation and the inflating operation is that the pressure communicated to the right side of the pilot operated control valves POCV1 and left side of POCV2 is now on the order of 25-45 PSI and is delivered through regulator R2 by means of the hand valve 46. In this way, the pilot operated control valve POCV2 and its related circuitry are comparing the second selected air pressure (25-45 PSI) with the air pressure attained within the tire in order to determine when to shut off air flow to the tire. This second pressure regulator R2 is externally adjustable by the operator by operation of a rotatable knob 90 and it is contemplated that the range of inflation pressures would be 25-45 PSI. To guard against an operator adjusting the pressure of pressure regulator R2 to an improper high level, the pressure regulator R2 is limited to a maximum pressure of 60 PSI. Pressure relief 77 limits pressure attained within the tire to 120 PSI.

With this construction, as the tire is brought from the relatively low pressure of sealing (12-15 PSI) to the modest pressure (25-45 PSI) for inflating and ensuring seating, the operator is protected from serious injury by requiring that he operate both a foot pedal valve located on the tire changing machine and hand valve remotely located on the cabinet of the control apparatus, thereby making it unlikely that the head and torso of the operator will be positioned over the wheel. Even in the unlikely event that the tire should fail and somehow strike the operator even though he is not directly over the tire and wheel, the apparatus limits the maximum pressure that can be attained within the tire so that the energy released in such a failure is relatively modest, thereby tending to reduce any risk of serious injury or death.

By delivering the full pressure of the source air pressure directly to the tire through the pilot operated control valve POCV2, the invention provides for a high air flow rate to the tire through the air fill line, which ensures both effective sealing of the tire and a rapid filling of the tire. As air pressure is delivered to the tire through the control circuit 51, the air pressure is not regulated by the control circuit, but is delivered therethrough unregulated. In practice, the full static air pressure available at the source of air pressure is not presented to the tire because as the air flows through the various conduits to the tire, the flow itself reduces the pressure (dynamic air pressure) presented to the tire. Furthermore, there are some small frictional losses as the air flows through the small diameter conduits. For example, if the source static air pressure available at conduit 27 is 160 PSI, the dynamic pressure measured at the connector block 74 by the pressure gauge P3 might be only 120 PSI as air flows through conduit 36 to the tire. Of course, it is recommended that the sealing and seating be performed with the core of the valve stem or inflation valve removed therefrom so that the valve core does not impede the air flow. Once the tire has been sealed, seated and substantially inflated, one can briefly remove the air fill line from the valve in the rim assembly and reinsert the valve core in the valve and then remount the air fill line to top off the tire with the appropriate air pressure.

While the invention has been disclosed in a preferred form, it will be readily apparent to those skilled in the art that many modifications, deletions and additions may be made therein without departing from the spirit and scope of the invention as set forth in the following claims.

I claim:

1. In a tire changing apparatus of the type utilized for supporting a rim of a wheel in a horizontal attitude as the beads of a tire are sealed and seated against the flanges of the rim in response to air being delivered from a high pressure air source through the rim to the tire to inflate the tire, the improvement comprising:

first and second operator actuated valve means for delivering air from the high pressure air source to the tire;

air flow control means being responsive to the opening of said first operator actuated valve means for communicating air from said high pressure air source to the tire for a time period sufficient to fill the tire with air pressure up to a first amount of air pressure for sealing and seating the beads of the tire of the flanges of the rim;

said control means being responsive to the opening of both said first and second operator actuated valve means for communicating air from said high pressure air source to the tire for a time period sufficient to fill the tire with air pressure up to a second amount of air pressure which is higher than the first amount of air pressure.

2. An apparatus as claimed in claim 1 wherein said control means comprises alarm means for generating an audible signal in response to the attainment of said first amount of air pressure.

3. An apparatus as claimed in claim 2 wherein said alarm means is also adapted for generating said audible signal in response to the attainment of said second amount of air pressure.

4. An apparatus as claimed in claim 2 wherein said alarm means is adapted for generating said audible signal in response to the delivering of source air pressure to said air fill line.

5. The tire changing apparatus of claim 1 and wherein said first operator actuated valve means comprises a foot actuated valve, so that the operator can operate the foot actuated valve with his foot while using his hands to adjust the tire with respect to the rim to achieve sealing and seating the beads of the tire to the rim.

6. The tire changing apparatus of claim 3 and wherein said second operator actuated valve mean comprises a hand actuated valve displaced from the foot actuated valve at a distance and direction that requires the upper body portion of the operator to be removed from over the tire and rim when the operator actuates the hand actuated valve means.

7. The tire changing apparatus of claim 1 and wherein said control means comprises a pilot valve which is normally open to permit air to be communicated from said high pressure air source through said first operator actuated valve means to the tire when said first operator actuated valve means is first opened; and an air pressure feedback means for receiving air from said pilot valve and urging said pilot valve to its closed position in response to the air in the tire reaching a predetermined pressure.

8. The tire changing apparatus of claim 1 and wherein said first and second operator actuated valve means are positioned at distances and directions from the tire mounted on the tire changing apparatus that requires the body of the operator to be removed from over the tire and rim when the operator actuates the first and second operator-actuated valve means.

9. A method of mounting, sealing, seating and inflating an automobile tire having annular beads on a rim assembly having flanges, comprising the steps of:

slipping the beads of a tire over a flange of the rim assembly to loosely mount the annular beads of the tire between the flanges of the rim assembly;

opening a foot actuated air valve to deliver air from a high pressure air source to an interior cavity of the tire and manually adjusting the position of the tire on the rim until a first predetermined pressure level is attained in the interior cavity of the tire to seal and seat the annular beads of the tire to the flanges of the rim assembly;

monitoring air pressure developed within the interior cavity of the tire during sealing of the annular beads of the tire to the flanges of the rim assembly to detect the attainment of the first predetermined pressure level in the interior cavity of the tire;

interrupting the delivery of air from the high pressure air source to the interior cavity of the tire in response to attainment of the first predetermined pressure level in the interior cavity of the tire;

simultaneously opening the foot actuated air valve and a hand actuated air valve to deliver air from the high pressure air source to the interior cavity of the tire until a second predetermined pressure level higher than the first predetermined pressure level is attained in the interior cavity of the tire;

monitoring air pressure developed within the interior cavity of the tire to detect the attainment of the second predetermined pressure level greater than the first predetermined pressure level; and interrupting the delivery of air to the interior cavity of the tire upon attainment of the second predetermined pressure level.

10. A method as claimed in claim 9 further comprising the step of generating an audible signal in response to delivering pressurized air to the interior cavity of the tire.

11. A method as claimed in claim 9 further comprising the step of generating an audible signal in response to the attainment of two predetermined pressure levels.

12. A method of mounting, sealing, seating and inflating an automobile tire having annular beads on a rim assembly having flangs comprising the steps of:

slipping the annular beads of a tire over a flange of the wheel to loosely mount the annular beads of the tire between the flanges of the rim assembly;

actuating a foot valve to deliver unregulated pressurized air to the interior cavity of the tire until a first predetermined pressure level is attained in the cavity of the tire to seal the annular beads of the tire against the flangs of the rim assembly and to induce the annular beads to seat against the flanges of the rim assembly, monitoring air pressure developed within the interior cavity of the tire during sealing to detect the attainment of the first predetermined pressure level.

in response to attainment of the first predetermined air pressure level in the interior cavity of the tire, interrupting the delivery of air to the interior cavity of the tire;

actuating a hand valve and the foot valve continuously and simultaneously to deliver unregulated pressurized air to the interior cavity of the tire until a second predetermined pressure level, higher than the first predetermined pressure level, is attained in the interior cavity of the tire, monitoring air pressure developed within the interior cavity of the tire to detect the attainment of the second predetermined pressure level; and in response to attaining the second predetermined pressure level, interrupting the delivery of air to the interior cavity of the tire.

13. A method as claimed in claim 12 further comprising the step of generating an audible signal in response to delivering pressurized air to the interior cavity of the tire.

14. A method as claimed in claim 12 further comprising the step of generating an audible signal in response to the attainment of two predetermined pressure levels.

* * * * *